United States Patent
Nakajima

(10) Patent No.: US 9,303,711 B2
(45) Date of Patent: Apr. 5, 2016

(54) DAMPER WITH VARIABLE DAMPING FORCE

(75) Inventor: Kiyoshi Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 22 days.

(21) Appl. No.: 14/002,546

(22) PCT Filed: Mar. 2, 2012

(86) PCT No.: PCT/JP2012/055481
§ 371 (c)(1),
(2), (4) Date: Aug. 30, 2013

(87) PCT Pub. No.: WO2012/118211
PCT Pub. Date: Sep. 7, 2012

(65) Prior Publication Data
US 2013/0341140 A1 Dec. 26, 2013

(30) Foreign Application Priority Data
Mar. 2, 2011 (JP) .................... 2011-044571

(51) Int. Cl.
F16F 9/18 (2006.01)
F16F 9/32 (2006.01)
F16F 9/46 (2006.01)

(52) U.S. Cl.
CPC . *F16F 9/18* (2013.01); *F16F 9/187* (2013.01); *F16F 9/325* (2013.01); *F16F 9/466* (2013.01)

(58) Field of Classification Search
CPC ............. F16F 9/18; F16F 9/187; F16F 9/325; F16F 9/466
USPC ............. 188/266.1, 266.2, 266.5, 266.6, 315, 188/313
See application file for complete search history.

(56) References Cited

U.S. PATENT DOCUMENTS 4,076,276 A * 2/1978 Wijnhoven et al. ........ 267/64.11
5,325,942 A * 7/1994 Groves et al. .............. 188/282.6
(Continued)

FOREIGN PATENT DOCUMENTS

CN 1918399 A 2/2007
CN 101235861 A 8/2008
(Continued)

OTHER PUBLICATIONS

Chinese Office Action, issuing date of Sep. 3, 2014, issued over the corresponding CN Patent Application No. 201280011248.7 with the English translation thereof.
(Continued)

*Primary Examiner* — Robert A Siconolfi
*Assistant Examiner* — Charles Poon
(74) *Attorney, Agent, or Firm* — Carrier Blackman & Associates, P.C.; Joseph P. Carrier; William D. Blackman

(57) ABSTRACT

A damper includes: an inner cylinder defining an inner chamber, having a slidable contact piston; an outer cylinder outside the inner cylinder and defining a reservoir chamber between the inner outer cylinders; and a damping-force control device controlling damping force by controlling a flow rate of an operating oil between the inner reservoir chambers. The control device includes a valve seat externally, projecting from the outer cylinder, having an opening for a first communicating channel connected to the inner chamber and an opening for a second communicating channel connected to the reservoir chamber, a valve element opening and closing on the valve seat by electromagnetic force, and a cap defining a variable pressure chamber between the cap and the valve element, and integrally holds the valve element and the valve seat. The variable pressure chamber can be connected to the first and the second communicating channels.

9 Claims, 12 Drawing Sheets

(56) References Cited

U.S. PATENT DOCUMENTS

| | | | |
|---|---|---|---|
| 5,398,787 A * | 3/1995 | Woessner et al. | 188/266.6 |
| 5,518,089 A * | 5/1996 | Handke et al. | 188/266.6 |
| 5,522,486 A * | 6/1996 | Fulks et al. | 188/315 |
| 5,730,260 A * | 3/1998 | Thyssen | 188/266.5 |
| 5,890,568 A * | 4/1999 | De Kock et al. | 188/266.5 |
| 5,924,528 A * | 7/1999 | Vermolen et al. | 188/266.1 |
| 6,079,526 A | 6/2000 | Nezu et al. | |
| 7,458,448 B2 | 12/2008 | Katou et al. | |
| 7,562,750 B2 * | 7/2009 | Lemmens et al. | 188/266.1 |
| 7,604,101 B2 * | 10/2009 | Park | 188/322.2 |
| 7,896,311 B2 | 3/2011 | Jee | |
| 8,146,897 B2 * | 4/2012 | Beck | 267/64.17 |
| 8,251,355 B2 * | 8/2012 | Tomiuga et al. | 267/64.26 |
| 8,469,162 B2 * | 6/2013 | Nishimura et al. | 188/266.2 |
| 2008/0277217 A1 * | 11/2008 | Nakajima et al. | 188/313 |
| 2009/0200125 A1 * | 8/2009 | Sonsterod | 188/266.4 |
| 2009/0242339 A1 | 10/2009 | Nakadate et al. | |
| 2012/0199429 A1 * | 8/2012 | Oshie et al. | 188/313 |

FOREIGN PATENT DOCUMENTS

| | | |
|---|---|---|
| JP | H09-236147 A | 9/1997 |
| JP | 2002-364697 A | 12/2002 |
| JP | 2006038097 A | 2/2006 |
| JP | 2008-275126 A | 11/2008 |
| JP | 2009-243636 A | 10/2009 |
| JP | 2010-025185 A | 2/2010 |
| JP | 2011-007322 A | 1/2011 |

OTHER PUBLICATIONS

Chinese Office Action issued over the corresponding CN Patent Application No. 201280011248.7.

* cited by examiner

DAMPER WITH VARIABLE DAMPING FORCE

TECHNICAL FIELD

The present invention relates to a damper with variable damping force, the damping force of which can be variably controlled.

BACKGROUND ART

In a damper with variable damping force which has been proposed (for example, in Patent document 1), a valve element which is arranged in a flow channel between a reservoir and a cylinder containing a piston is opened or closed by an electromagnetic solenoid actuator so as to change the damping force of the damper. In addition, in another damper with variable damping force which has been proposed (for example, in Patent document 2), a valve element which is arranged in a flow channel formed in a piston contained in a cylinder is opened or closed by electromagnetic attractive force generated by an electromagnetic solenoid so as to change the damping force of the damper.

PRIOR ART DOCUMENTS

Patent Documents

Patent document 1: Japanese Patent Laid-Open No. H09-236147
Patent document 2: Japanese Patent Laid-Open No. 2008-275126

SUMMARY OF INVENTION

Technical Problem

However, since the valve element in the damper with variable damping force disclosed in Patent document 1 is opened or closed by the electromagnetic solenoid actuator, the construction of the damper with variable damping force disclosed in Patent document 1 is complicated, and the number of the constituent parts of the damper with variable damping force disclosed in Patent document 1 becomes large. Therefore, the manufacturing cost of the damper with variable damping force disclosed in Patent document 1 becomes high.

On the other hand, in the damper with variable damping force disclosed in Patent document 2, the valve element is directly brought into contact by the electromagnetic solenoid, the construction of the damper with variable damping force disclosed in Patent document 2 is simple, and the number of the constituent parts of the damper with variable damping force disclosed in Patent document 2 is small. Therefore, the manufacturing cost of the damper with variable damping force disclosed in Patent document 2 can be lowered. However, the electromagnetic force (attractive force) generated by the electromagnetic solenoid is inversely proportional to the square of the distance. Therefore, when the valve opens and the valve element comes apart from the electromagnetic solenoid by a certain distance, the effect of the electromagnetic force generated by the electromagnetic solenoid rapidly attenuates, so that there is a possibility that great power consumption is needed for generation of electromagnetic force which is necessary for attracting the valve element and closing the valve.

In view of above, the object of the present invention is to provide a damper with variable damping force which has a simple structure and can suppress the power consumption.

Solution to Problem

An aspect of the present invention provides a damper with variable damping force comprising:
an inner cylinder which defines an inner chamber therein, where a piston is in slidable contact with the inner chamber;
an outer cylinder which is arranged outside the inner cylinder and defines a reservoir chamber between the inner cylinder and the outer cylinder; and
a damping-force control device which controls a damping force by controlling a flow rate of an operating oil between the inner chamber and the reservoir chamber;
wherein
the damping-force control device includes,
a valve seat which is formed to externally project from the outer cylinder, and in which an opening for a first communicating channel connected to the inner chamber and an opening for a second communicating channel connected to the reservoir chamber are formed,
a valve element which opens and closes on the valve seat by electromagnetic force, and controls a flow of the operating oil between the first communicating channel and the second communicating channel, and
a cap which defines a variable pressure chamber between the valve seat and the valve element, and integrally holds the valve element and the valve seat, where the variable pressure chamber can be connected to the first communicating channel and the second communicating channel.

According to the present invention, the damper with variable damping force includes the inner and outer cylinders, the piston, the reservoir chamber, and the damping-force control device which includes the valve seat, the valve element, and the cap. Therefore, the damping-force control device and the damper with variable damping force can be constructed to have a simple structure. In addition, since the number of parts can be reduced, the manufacturing cost is lowered.

In addition, in the state in which the valve element is opened, the valve element comes into contact with the cap when the extent of opening of the valve element increases. Therefore, the increase in the extent of opening can be suppressed, and the electromagnetic solenoid can attract the valve element and close the valve even when the electromagnetic force is small. Consequently, the power consumption can be reduced.

In addition, preferably the first communicating channel communicates the second communicating channel through an opening of the valve element in a state in which the valve element is open, and an biasing force which impels the valve element to a direction of closing the valve element is exerted on the valve element by a differential pressure generated between a front side and a back side of the valve element when the operating oil flows.

In the case where the damper with variable damping force has the above feature, the flow channel from the first communication channel to the second communication channel in the variable pressure chamber is formed to pass the side of the valve element opposite to the valve seat, and the operating oil flowing through the flow channel applies to the valve element a pressure in a direction of closing the valve. Therefore, it is possible to prevent the valve element from coming apart from the electromagnetic solenoid, and thus close the valve with a small electromagnetic force. Consequently, the power consumption can be reduced.

In addition, preferably, the valve element comprises, a first through hole arranged in a vicinity of an open and close portion which opens and closes the opening for the first communicating channel, a support portion which supports the open and close portion in a part of an outer peripheral portion of the valve seat in such a manner that the open and close portion can be freely opened and closed, and a second through hole arranged to overlap a part of the opening for the second communicating channel. Preferably, the first through hole is more apart from the support portion than the second through hole.

In the case where the damper with variable damping force has the above feature, a flow channel of a flow from the opening for the first communicating channel through the first hole and the side of the valve element opposite to the valve seat can be formed in the variable pressure chamber. This flow channel further passes through the second hole and reaches the opening for the second communicating channel. Since the first hole is more apart from the support portion than the second hole, the portion of the valve element in the vicinity of the second hole is more close to the valve seat than the portion of the valve element in the vicinity of the first hole. Therefore, when the operating oil flows from the variable pressure chamber to the second communicating channel, the damping force is generated by the second hole, which is close to the valve seat (the opening for the second communicating channel). At this time, the inner pressure on the side of the valve element opposite to the valve seat in the variable pressure chamber becomes higher than the inner pressure in the second communicating channel (on the valve seat side of the valve element in the variable pressure chamber), so that a force in the direction of closing the valve is generated.

In addition, preferably, the damper with variable damping force, further comprises a spacer arranged between the valve element and the valve seat to provide an intermediate channel through which the first communicating channel communicates with the second communicating channel without passing through the valve element.

In the case where the damper with variable damping force has the above feature, even when a rapid stroke or the like occurs, it is possible to suppress the driving force of the valve element and prevent a rapid rise of the damping force.

Advantageous Effect of Invention

According to the present invention, there is provided a damper with variable damping force which has a simple structure and can suppress the power consumption.

DESCRIPTION OF EMBODIMENTS

Figure 1:
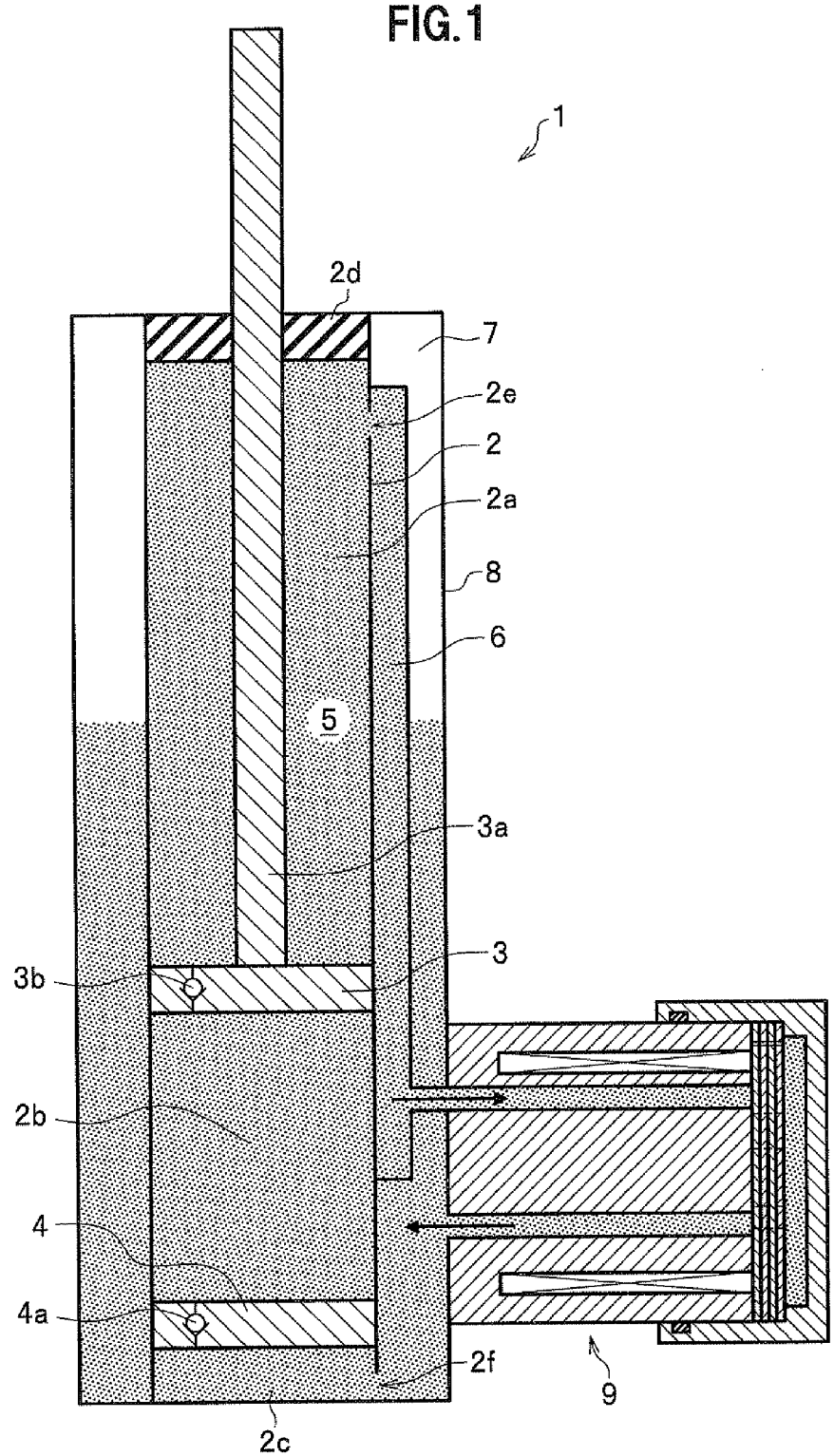
FIG. 1 is a longitudinal cross-sectional view of a damper with variable damping force according to a first embodiment of the present invention.

Hereinbelow, the embodiments of the present invention are explained in detail below with reference to drawings when necessary. In the drawings, identical or equivalent components or constituents are indicated by the same reference numbers, and identical explanations are not repeated.

(First Embodiment)

FIG. 1 is a longitudinal cross-sectional view of a damper 1 with variable damping force according to a first embodiment of the present invention. In the damper 1 with variable damping force, a piston 3 is slidably fitted into a cylinder 2, i.e., the piston 3 is in slidable contact with the cylinder 2, where the cylinder 2 is filled with an operating oil 5. An upper chamber (inner chamber) 2a is defined by the cylinder 2 and the piston 3, and an end of a piston rod 3a is connected to the piston 3. The piston rod 3a extends across the upper chamber 2a and passes through an upper end portion of the cylinder 2 and a buffer member 2d. The piston rod 3a is slidably fitted into the upper end portion of the cylinder 2 and the buffer member 2d without leakage of the operating oil 5 outside. A bottom valve 4 is arranged below the piston 3 in the cylinder 2. A check valve 4a is arranged in the bottom valve 4. The check valve 4a allows the operating oil 5 to flow from a reservoir chamber 7 through a through hole 2f and a lower chamber 2c to a middle chamber 2b, and does not allow the operating oil 5 to flow from the middle chamber 2b to the reservoir chamber 7. Alternatively, the bottom valve 4 (the check valve 4a) may be arranged at the through hole 2f. In this case, no partition exists between the lower chamber 2c and the middle chamber 2b, so that one of the lower chamber 2c and the middle chamber 2b can be omitted. In addition, a check valve 3*b* is arranged in the piston 3. The check valve 3*b* allows the operating oil 5 to flow from the middle chamber 2*b* to the upper chamber (inner chamber) 2*a*, and does not allow the operating oil 5 to flow from the upper chamber (inner chamber) 2*a* to the middle chamber 2*b*.

An outer cylinder 8 is arranged outside the cylinder 2. The reservoir chamber 7 is defined by the cylinder 2 and the outer cylinder 8. The reservoir chamber 7 is filled with the operating oil 5 and a gas. The reservoir chamber 7 is connected to the middle chamber 2*b* through the bottom valve 4, which is arranged in the lower portion of the cylinder 2.

Further, a through hole 2*e* is arranged in the upper portion of the cylinder 2. The upper chamber (inner chamber) 2*a* is connected to an upper portion of an intermediate oil channel 6 through the through hole 2*e*. The intermediate oil channel 6 is arranged outside the cylinder 2 inside the outer cylinder 8 and defined by a portion of the side wall of the cylinder 2. The intermediate oil channel 6 is arranged along the axis direction of the cylinder 2, and the lower portion of the intermediate oil channel 6 is connected to a damping-force control device 9. The damping-force control device 9 is arranged outside the lower portion of the outer cylinder 8, and connected to the lower portion of the reservoir chamber 7 in the lower portion of the outer cylinder 8.

In the above structure of the damper with variable damping force, the upper chamber (inner chamber) 2*a* is connected through the through hole 2*e*, the intermediate oil channel 6, and the damping-force control device 9 to the lower portion of the reservoir chamber 7 in this order, and is further connected through the through hole 2*f* and the bottom valve 4 to the middle chamber 2*b*. The upper portion of the intermediate oil channel 6 is connected to the upper chamber (inner chamber) 2*a*, and the lower portion of the intermediate oil channel 6 is connected to the damping-force control device 9. The damping-force control device 9 is connected to the upper chamber (inner chamber) 2*a* through the intermediate oil channel 6, and to the reservoir chamber 7. The damping-force control device 9 controls the damping force generated by the damper 1 with variable damping force, by controlling the flow rate of the operating oil 5 through the intermediate oil channel 6, i.e., by controlling the flow rate of the operating oil 5 flowing from the intermediate oil channel 6 into the damping-force control device 9.

When the piston rod 3*a* is drawn out of the cylinder 2 in the damper 1 with variable damping force, the piston 3 is raised with the piston rod 3*a*, and the volume of the upper chamber (inner chamber) 2*a* is reduced. The operating oil 5 in the upper chamber (inner chamber) 2*a* flows through the through hole 2*e* and the intermediate oil channel 6 to the damping-force control device 9. Further, the operating oil 5 flows out of the damping-force control device 9 to the reservoir chamber 7, so that the liquid level of the operating oil 5 in the reservoir chamber 7 is raised, and the gas above the liquid level is compressed. Furthermore, the operating oil 5 flows out of the reservoir chamber 7 through the bottom valve 4 (the check valve 4*a*) to the middle chamber 2*b*.

On the other hand, when the piston rod 3*a* is pushed into the cylinder 2 in the damper 1 with variable damping force, an amount of the operating oil 5 corresponding to the extent of entry of the piston rod 3*a* flows out of the upper chamber (inner chamber) 2*a* through the through hole 2*e* and the intermediate oil channel 6 to the damping-force control device 9.

As explained above, either when the piston rod 3*a* is drawn out of the cylinder 2 or when the piston rod 3*a* is pushed into the cylinder 2, the operating oil 5 flows out of the upper chamber (inner chamber) 2*a* through the intermediate oil channel 6 to the damping-force control device 9, and further flows from the damping-force control device 9 to the reservoir chamber 7. In other words, both when the piston rod 3*a* is drawn out of the cylinder 2 and when the piston rod 3*a* is pushed into the cylinder 2, the operating oil 5 in the damping-force control device 9 always unidirectionally flows in a direction from the intermediate oil channel 6 into the damping-force control device 9 and from the damping-force control device 9 to the reservoir chamber 7.

Figure 2:
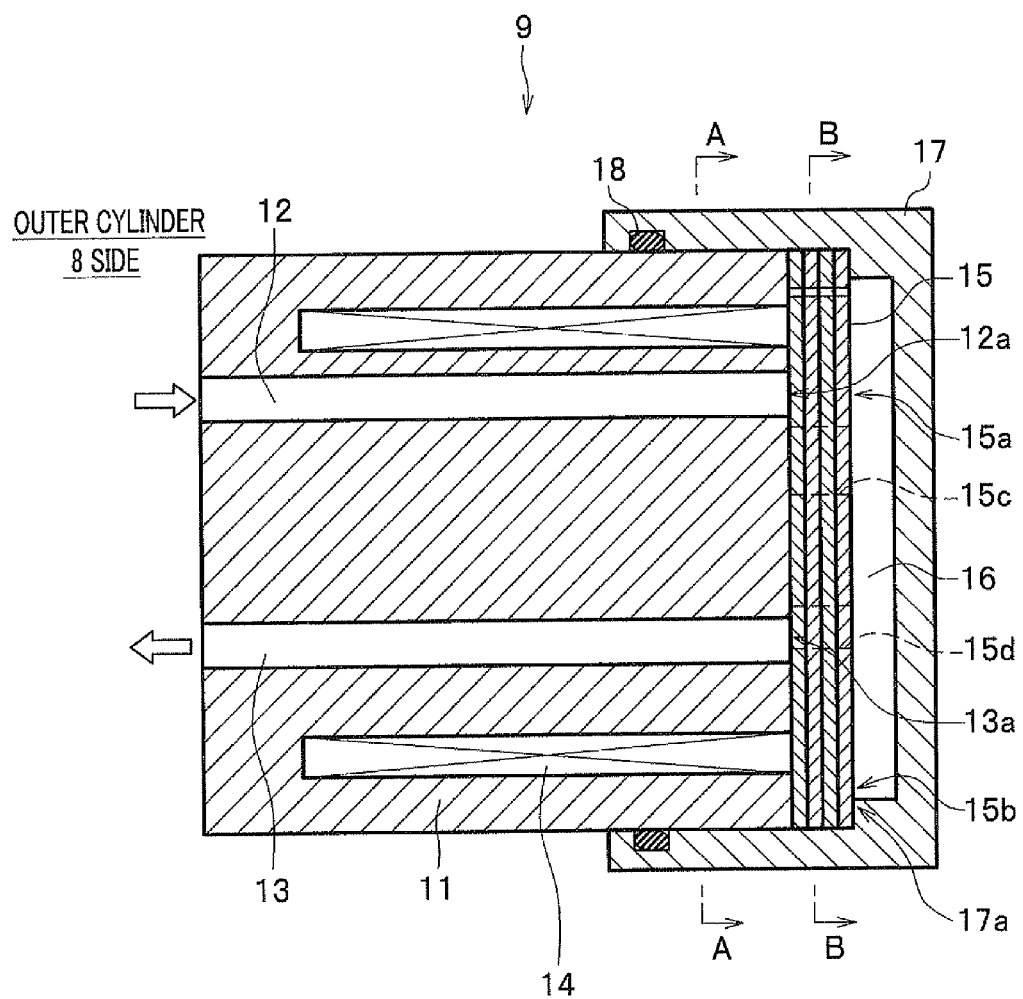
FIG. 2 is a longitudinal cross-sectional view of a damping-force control device arranged in the damper with variable damping force according to the first embodiment of the present invention.

FIG. 2 is a longitudinal cross-sectional view of the damping-force control device 9 arranged in the damper with variable damping force according to the first embodiment of the present invention. The damping-force control device 9 includes a valve seat 11 having a cylindrical post shape. An electromagnetic solenoid 14 is embedded in the valve seat 11 along the circular periphery of the cylindrical post shape of the valve seat 11. It is preferable that a soft magnetic material exhibiting a low hysteresis (having a small coercive force) and having a great magnetic permeability, such as soft iron, be used in the valve seat 11. A first communicating channel 12 and a second communicating channel 13 are formed in the valve seat 11. The first communicating channel 12 and the second communicating channel 13 are arranged apart from each other, and each penetrate the valve seat 11. The first communicating channel 12 is connected, on the outer cylinder 8 side, to the intermediate oil channel 6 (as illustrated in FIG. 1) and further to the upper chamber (inner chamber) 2*a* (as illustrated in FIG. 1), so that the operating oil 5 flows from the outer cylinder 8 side into the damping-force control device 9. The second communicating channel 13 is connected, on the outer cylinder 8 side, to the reservoir chamber 7 (as illustrated in FIG. 1), so that the operating oil 5 flows out of the damping-force control device 9 to the outer cylinder 8 side (i.e., to the reservoir chamber 7).

The side of the valve seat 11 opposite to the outer cylinder 8 is approximately flat, and a valve element 15 having an approximately flat shape is arranged on the side of the valve seat 11 opposite to the outer cylinder 8. An opening (liquid outlet) 12*a* of the first communicating channel 12 and an opening (liquid inlet) 13*a* of the second communicating channel 13 are arranged on the approximately flat surface of the valve seat 11 located opposite to the outer cylinder 8. The outer peripheral portion of the valve element 15 is held between a step portion 17*a* of a cap 17 and the valve seat 11. It is preferable that a soft magnetic material exhibiting a low hysteresis (having a small coercive force) and having a great magnetic permeability, such as soft iron, be used in the valve element 15 as in the valve seat 11. In the example illustrated in FIG. 2, the valve element 15 is formed by laminating four plates. Alternatively, the number of plate(s) constituting the valve element 15 may be other than four. A variable pressure chamber 16 is arranged on the side of the valve element 15 opposite to the valve seat 11. The variable pressure chamber 16 is defined by the cap 17 and the valve element 15 (or the valve seat 11). In particular, when the variable pressure chamber 16 is regarded to be defined by the cap 17 and the valve seat 11, the valve element 15 can be regarded to be contained in the variable pressure chamber 16, and the variable pressure chamber 16 can be regarded to be connected to the first communicating channel 12 and the second communicating channel 13. The cap 17 limits the maximum opening of the valve element 15. When the opening of the valve element 15 increases, a portion of the valve element 15 comes more apart from the valve seat 11, and approaches the cap 17. When the opening of the valve element 15 further increases, the portion of the valve element 15 comes into contact with the cap 17, and the opening of the valve element 15 does not further increase. An oil packing 18 is arranged between the side surface of the valve seat 11 and the cap 17, and the variable pressure chamber 16 is sealed up by the cap 17 in such a manner that the operating oil 5 in the variable pressure chamber 16 does not externally leak even when the operating oil 5 in the variable pressure chamber 16 is pressurized. It is preferable that a nonmagnetic material such as resin or aluminum be used in the cap 17 for preventing exertion of an attractive force on the valve element 15. The cap 17 is coupled to the outer periphery of the valve seat 11 by fitting, press fitting, or the like and held on the outer periphery of the valve seat 11. In order that the step portion 17a in the cap 17 can exert sufficient holding force on the outer peripheral portion of the valve element 15, the cap 17 and the seat face of the valve seat 11 are formed to be so close to each other that compressive force is exerted on the valve element 15.

FIG. 2 illustrates a state in which the valve element 15 is closed. Current flows in the electromagnetic solenoid 14 and electromagnetic force (attractive force) generated by the electromagnetic solenoid 14 and the valve seat 11 is exerted on the valve element 15, so that the valve element 15 is attracted by the electromagnetic solenoid 14 and the valve seat 11 and attracted with contact with the valve seat 11. Therefore, the opening (liquid outlet) 12a of the first communicating channel 12 is closed by an open/close portion 15a in the valve element 15, i.e., the opening (liquid outlet) 12a is closed. In addition, first through holes 15c penetrating the valve element 15 are arranged at positions spaced from and close to the open/close portion 15a (in a vicinity of the opening (liquid outlet) 12a). The opening (liquid inlet) 13a of the second communicating channel 13 communicates with the variable pressure chamber 16 through second through holes 15d arranged in the valve element 15 even in the state in which the valve element 15 is brought into contact with the valve seat 11. The open/close portion 15a, the first through holes 15c, and the second through holes 15d, which are arranged in the valve element 15, are supported by a support portion 15b in the valve element 15. The support portion 15b is supported by the outer periphery portion of the valve element 15.

Figure 3:
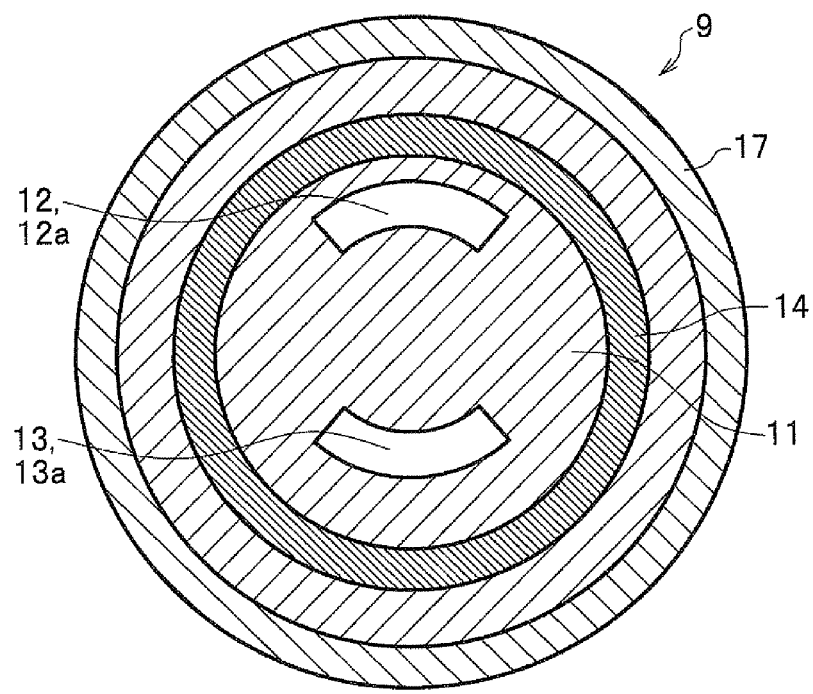
FIG. 3 is a (lateral) cross-sectional view viewed in an A-A direction indicated in FIG. 2.

FIG. 3 is a (lateral) cross-sectional view viewed in the A-A direction indicated in FIG. 2. The cap 17 and the electromagnetic solenoid 14 having an annular shape are arranged concentrically with the valve seat 11 having a cylindrical post shape. The first communicating channel 12 and the second communicating channel 13 each have a sectorial cross-sectional shape, and are arranged along the inner side of the annular electromagnetic solenoid 14. The first communicating channel 12 is arranged closer to the electromagnetic solenoid 14 than the second communicating channel 13, so that a greater electromagnetic force is generated in the vicinity of the first communicating channel 12 than in the vicinity of the second communicating channel 13.

In the example of FIG. 3, the cross-sectional area of the first communicating channel 12 (the aperture area of the opening 12a in the first communicating channel 12) is equalized with the cross-sectional area of the second communicating channel 13 (the aperture area of the opening 13a in the second communicating channel 13). However, the cross-sectional areas of the first and second communicating channels 12 and 13 need not be equal. For example, the cross-sectional area of the second communicating channel 13 (the aperture area of the opening 13a in the second communicating channel 13) may be greater than the cross-sectional area of the first communicating channel 12 (the aperture area of the opening 12a in the first communicating channel 12). In this case, when the flow rate is high, increase in the conduit resistance of the second communicating channel 13 can be suppressed, and therefore the damping force can be reduced (since the piston rod 3a can be easily displaced with respect to the cylinder 2).

Figure 4:
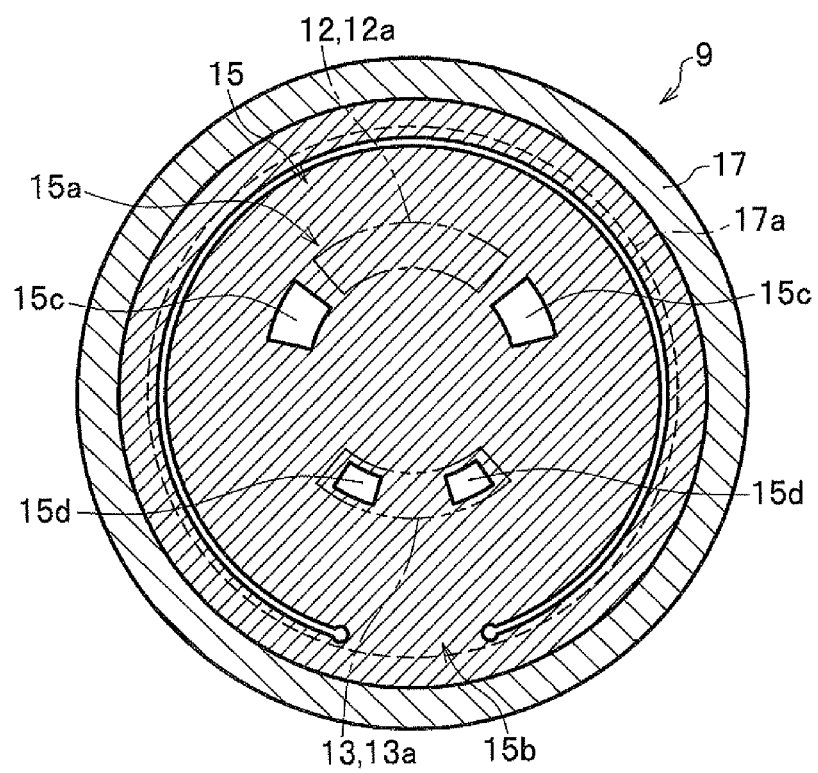
FIG. 4 is a (lateral) cross-sectional view viewed in a B-B direction indicated in FIG. 2.

FIG. 4 is a (lateral) cross-sectional view of the B-B cross section indicated in FIG. 2. The valve element 15 has the first through holes 15c, arranged at the position spaced from and close to the open/close portion 15a, which opens and closes the opening 12a of the first communicating channel 12. In addition, the second through holes 15d are arranged so as to overlap portions of the opening 13a of the second communicating channel 13. The aperture area of the second through holes 15d is smaller than the aperture area of the opening 13a of the second communicating channel 13. The support portion 15b supports the open/close portion 15a at a portion of the outer peripheral portion of the valve element 15 (the step portion 17a, the valve seat 11 (see FIG. 2)) in such a manner that the open/close portion 15a can be freely opened or closed. The first through holes 15c are more apart from the support portion 15b than the second through holes 15d. The valve element 15 can be opened or closed on the valve seat 11 by the electromagnetic solenoid 14, so that open/close control of the opening 12a of the first communicating channel 12 can be performed. Therefore, when the flow rate is high in the damper 1 with variable damping force, the damping force can be reduced (since the piston rod 3a can be easily displaced with respect to the cylinder 2).

Figure 5A:
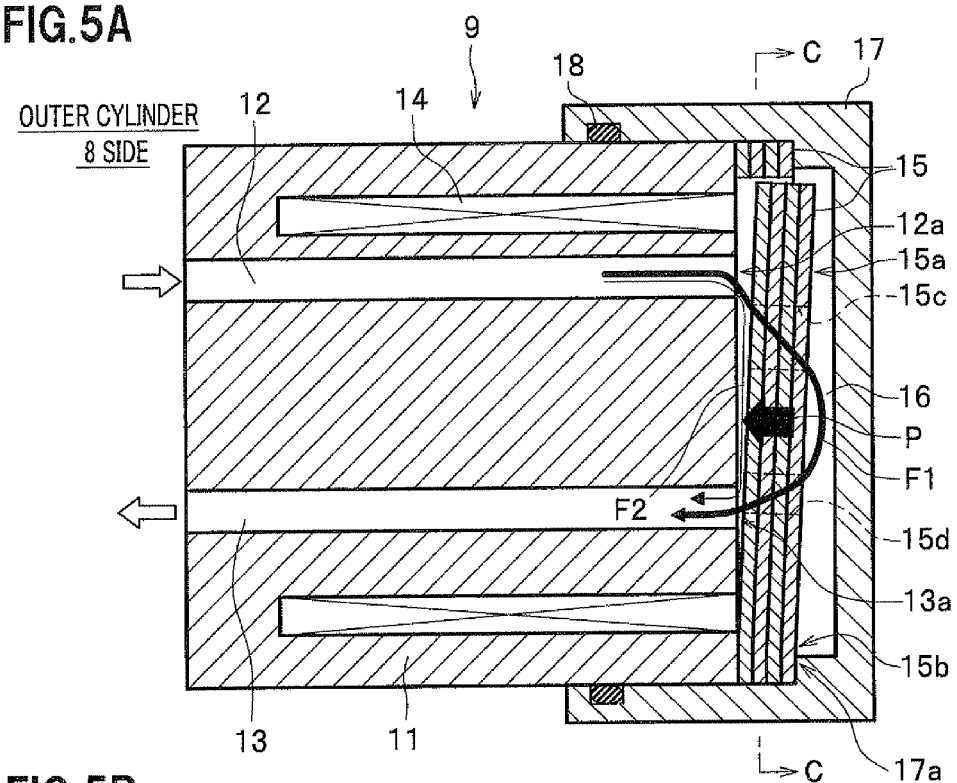
FIGS. 5A and 5B are a longitudinal cross-sectional view and a lateral cross-sectional view of the damping-force control device in the state in which a valve element is open, and indicate flow channels from a first communicating channel to a second communicating channel in a variable pressure chamber.
Figure 5B:
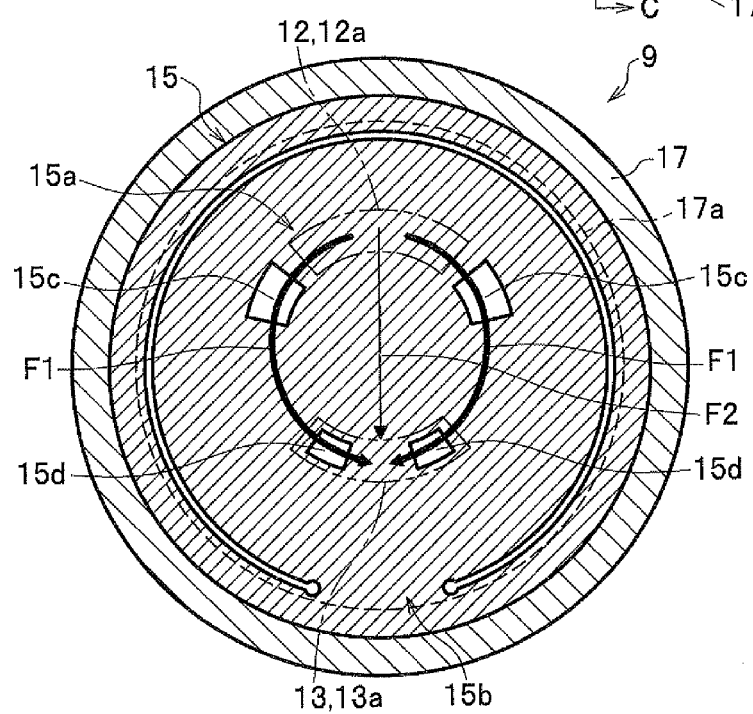

FIG. 5A is a longitudinal cross-sectional view of the damping-force control device 9 in the state in which the valve element 15 is open, and FIG. 5B is a lateral cross-sectional view of the damping-force control device 9 in the state in which the valve element 15 is open. In the state in which the valve element 15 is open, a flow channel F1 extending from the opening (liquid outlet) 12a of the first communicating channel 12 through the first through holes 15c and the side of the valve element 15 opposite to the valve seat 11 can be formed in the variable pressure chamber 16. The flow channel F1 further passes through the second through holes 15d and reaches the opening (liquid inlet) 13a of the second communicating channel 13. Since the second through holes 15d are nearer to the support portion 15b than the first through holes 15c, the portion of the valve element 15 in the vicinity of the second through holes 15d is closer to the valve seat 11 than the portion of the valve element 15 in the vicinity of the first through holes 15c in the state in which the valve element 15 is open. In addition, the aperture area of the second through holes 15d is smaller than the aperture area of the first through holes 15c. Therefore, when the operating oil 5 (illustrated in FIG. 1) flows from the variable pressure chamber 16 to the second communicating channel 13, the damping force is generated by the second through holes 15d, which is close to the valve seat 11 (the opening 13a of the second communicating channel 13). At this time, the pressure of the operating oil 5 is approximately equally applied to the valve seat 11 side (front side) of the valve element 15 and the opposite side (back side) of the valve element 15. Therefore, the valve element 15 is prevented from coming apart from the electromagnetic solenoid 14 and the valve seat 11, so that the electromagnetic solenoid 14 can attract and close the valve element 15 even with a small electromagnetic force. Since it is sufficient for the electromagnetic solenoid 14 to generate a small electromagnetic force, the power consumption can be reduced. Further, a flow channel F2 extending from the opening 12a through the valve seat 11 side of the valve element 15 to the opening 13a is also formed.

Furthermore, since the damping-force control device 9 can be basically formed of the valve seat 11, the electromagnetic solenoid 14, the valve element 15, and the cap 17, the damping-force control device 9 has a simple structure, the number of parts is small, and the manufacturing cost can be lowered.

(Second Embodiment)

Figure 6:
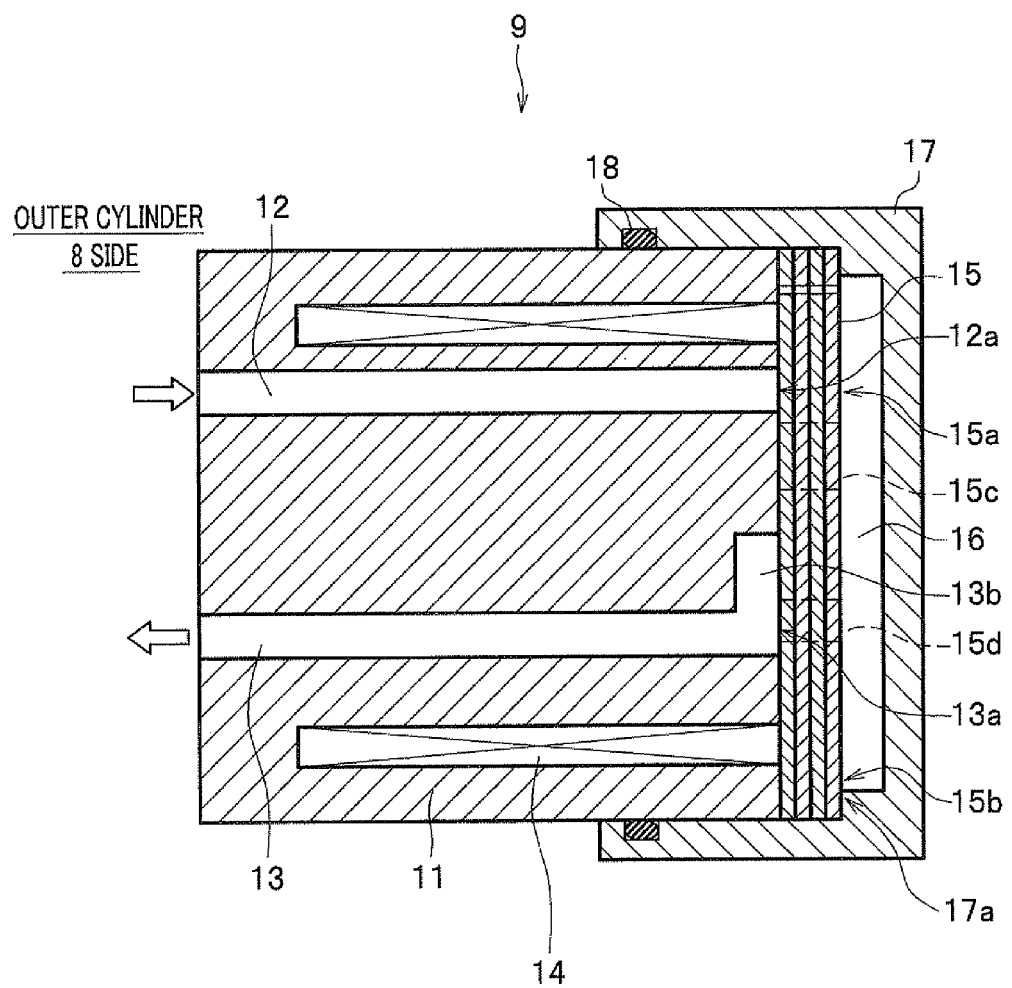
FIG. 6 is a longitudinal cross-sectional view of a damping-force control device which is arranged in a damper with variable damping force according to a second embodiment of the present invention.

FIG. 6 is a longitudinal cross-sectional view of the damping-force control device 9 which is arranged in the damper with variable damping force according to the second embodiment of the present invention. The second embodiment is different from the first embodiment in that a groove 13*b* is arranged at the opening (liquid inlet) 13*a* of the second communicating channel 13. The groove 13*b* is formed on the opening 12*a* side of the opening 13*a*. The provision of the groove 13*b* has an effect of broadening a portion of the flow channel F2 illustrated in FIG. 5A, so that the flow rate of the operating oil 5 through the flow channel F2 can be increased. Thus, it is possible to reduce the damping force when the valve is open.

(Third Embodiment)

Figure 7:
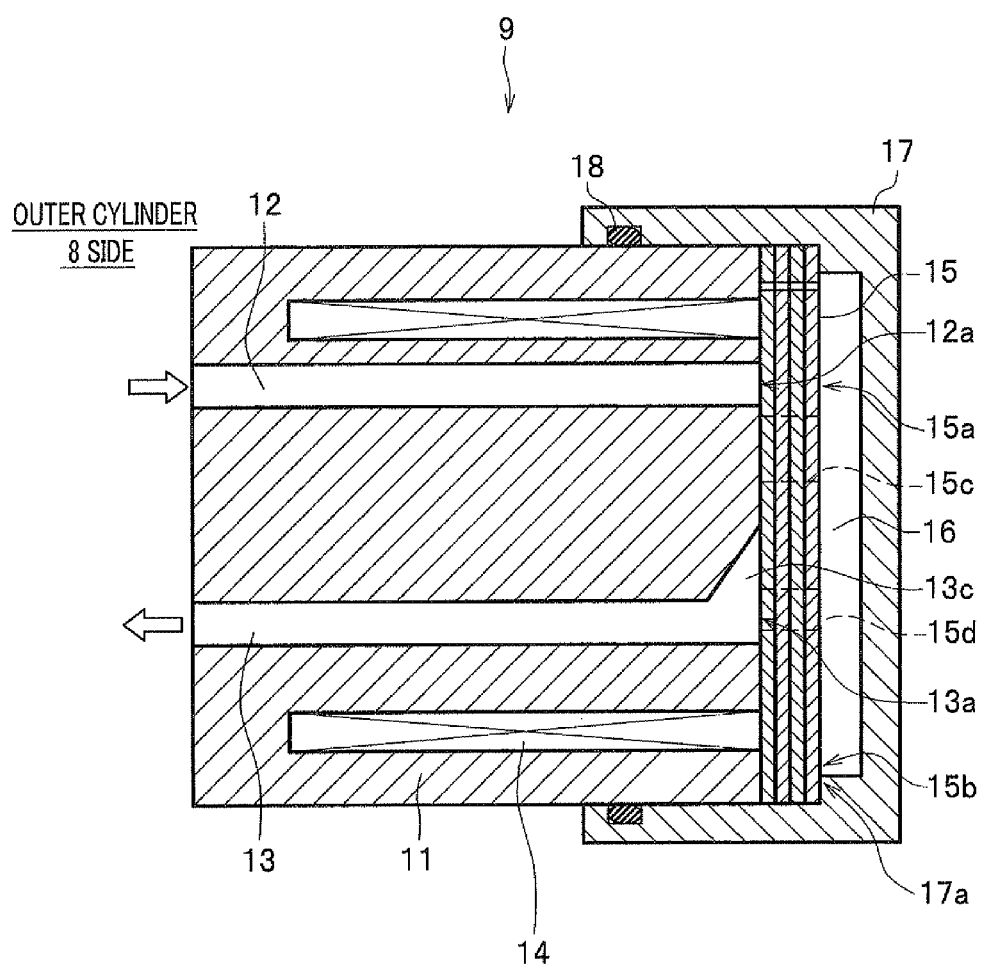
FIG. 7 is a longitudinal cross-sectional view of a damping-force control device which is arranged in a damper with variable damping force according to a third embodiment of the present invention.

FIG. 7 is a longitudinal cross-sectional view of the damping-force control device 9 which is arranged in the damper with variable damping force according to the third embodiment of the present invention. The third embodiment is different from the first embodiment in that a bevel portion 13*c* is arranged at the opening (liquid inlet) 13*a* of the second communicating channel 13. The bevel portion 13*c* is formed on the opening 12*a* side of the opening 13*a*. The provision of the bevel portion 13*c* has an effect of broadening a portion of the flow channel F2 illustrated in FIG. 5A, so that the flow rate of the operating oil 5 through the flow channel F2 can be increased. Thus, it is possible to reduce the damping force when the valve is open.

(Fourth Embodiment)

Figure 8:
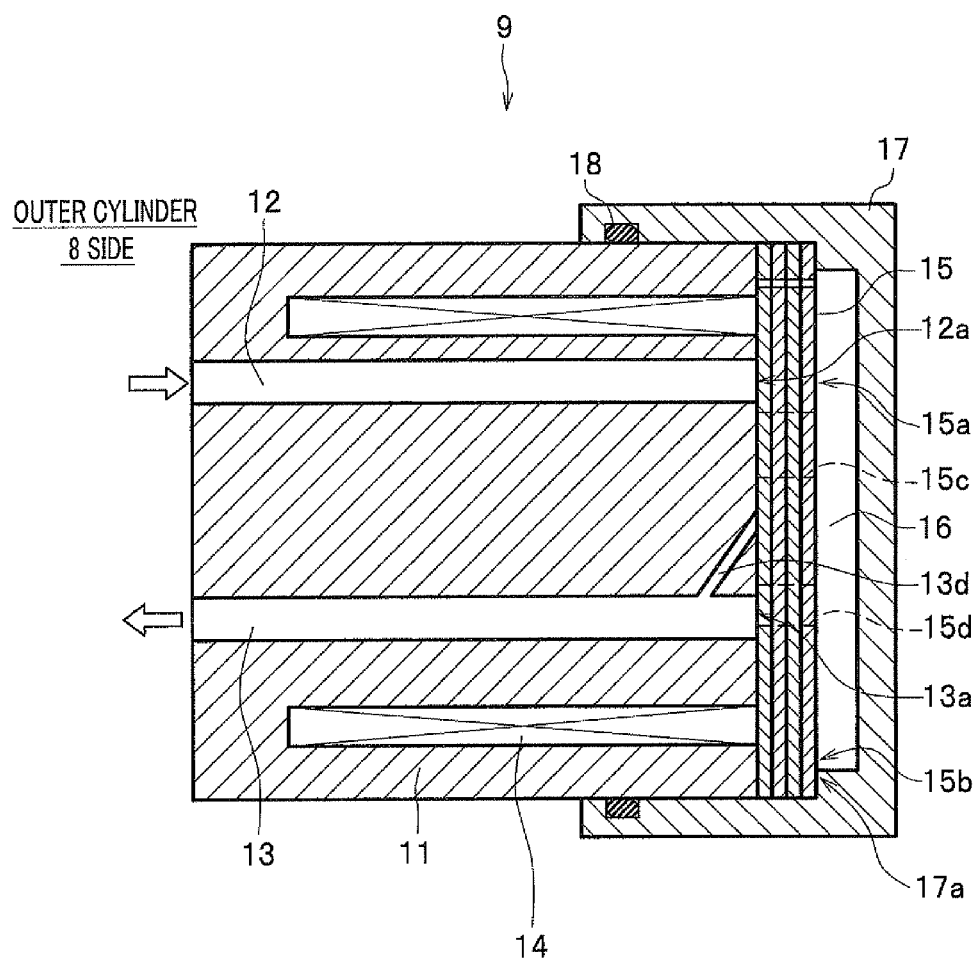
FIG. 8 is a longitudinal cross-sectional view of a damping-force control device which is arranged in a damper with variable damping force according to a fourth embodiment of the present invention.

FIG. 8 is a longitudinal cross-sectional view of the damping-force control device 9 which is arranged in the damper with variable damping force according to the fourth embodiment of the present invention. The fourth embodiment is different from the first embodiment in that a bypass channel 13*d* is arranged at the opening (liquid inlet) 13*a* of the second communicating channel 13. The bypass channel 13*d* is formed on the opening 12*a* side of the opening 13*a*. Since the part of the flow through the flow channel F2 branches into the 13*d*, the provision of the bypass channel 13*d* has an effect of substantially broadening the flow channel F2 illustrated in FIG. 5A, so that the flow rate of the operating oil 5 through the flow channel F2 can be increased. Thus, it is possible to reduce the damping force when the valve is open.

(Fifth Embodiment)

Figure 9:
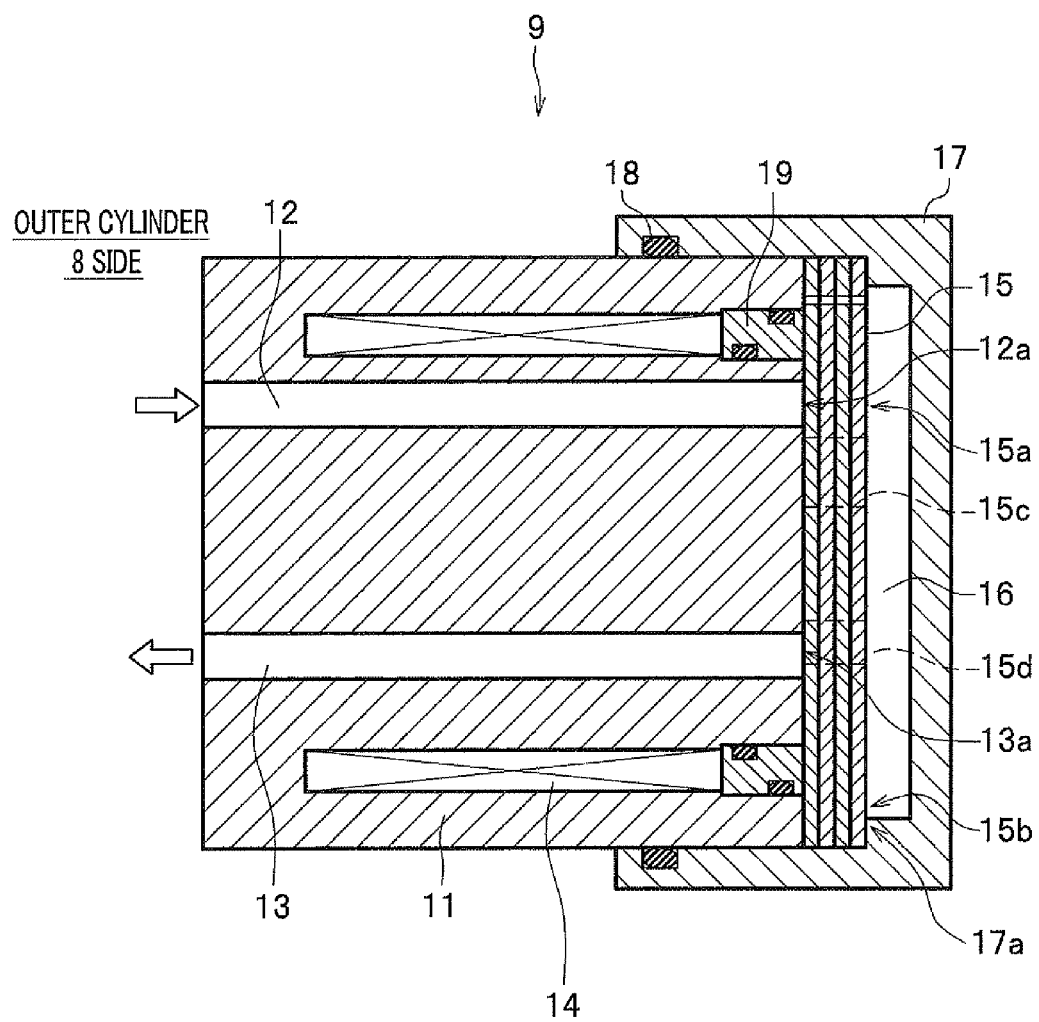
FIG. 9 is a longitudinal cross-sectional view of a damping-force control device which is arranged in a damper with variable damping force according to a fifth embodiment of the present invention.

FIG. 9 is a longitudinal cross-sectional view of the damping-force control device 9 which is arranged in the damper with variable damping force according to the fifth embodiment of the present invention. The fifth embodiment is different from the first embodiment in that the electromagnetic solenoid 14 is sealed up in the valve seat 11 with a sealant 19. Since the electromagnetic solenoid 14 does not come into contact with the operating oil 5, the electromagnetic solenoid 14 can be insulated from the operating oil 5 with high reliability. The sealant 19 is preferably a nonmagnetic material. In this case, when the valve is closed, the magnetic path generated in the valve seat 11 can be lead to the valve element 15, so that the attractive force can be kept strong.

(Sixth Embodiment)

Figure 10:
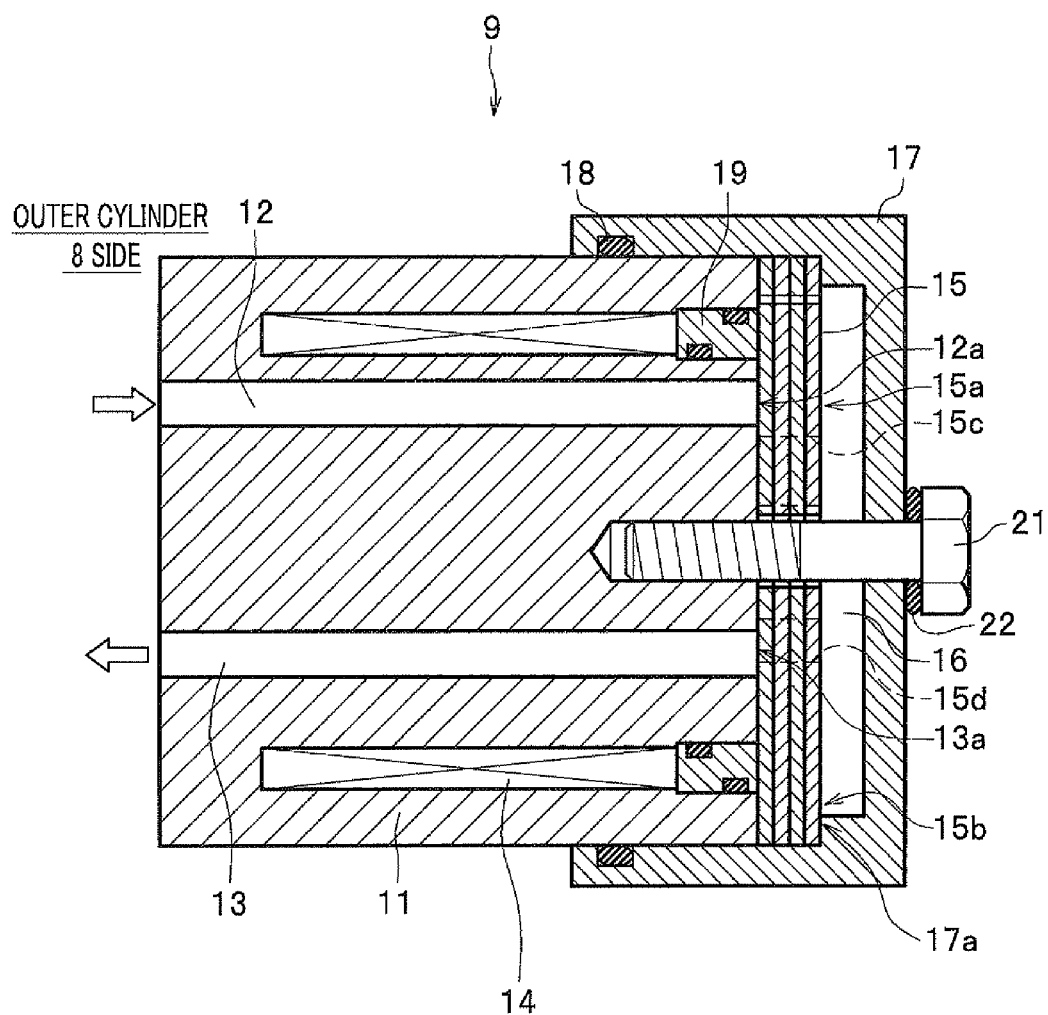
FIG. 10 is a longitudinal cross-sectional view of a damping-force control device which is arranged in a damper with variable damping force according to a sixth embodiment of the present invention.

FIG. 10 is a longitudinal cross-sectional view of the damping-force control device 9 which is arranged in the damper with variable damping force according to the sixth embodiment of the present invention. The sixth embodiment is different from the fifth embodiment in that a bolt 21 as a means for fastening the cap 17 is arranged approximately on the center axis of the valve seat 11. A female thread into which the bolt 21 is screwed is formed approximately on the center axis of the valve seat 11. A through-hole through which the bolt 21 passes is arranged at the center of the valve element 15. The side wall of the through-hole is so apart from the bolt 21 that the bolt 21 does not come into contact with the side wall of the through-hole even when the valve element 15 is opened or closed. A through-hole through which the bolt 21 passes is also arranged at the center of the cap 17. An oil packing 22 is arranged between the bolt 21 and the cap 17. The above provision enables simple and tight fastening of the cap 17 to the valve seat 11. In addition, the bolt 21 is preferably made of a nonmagnetic material. Since no magnetic path is formed in the bolt 21, it is possible to exert a strong attractive force on the valve element 15.

(Seventh Embodiment)

Figure 11:
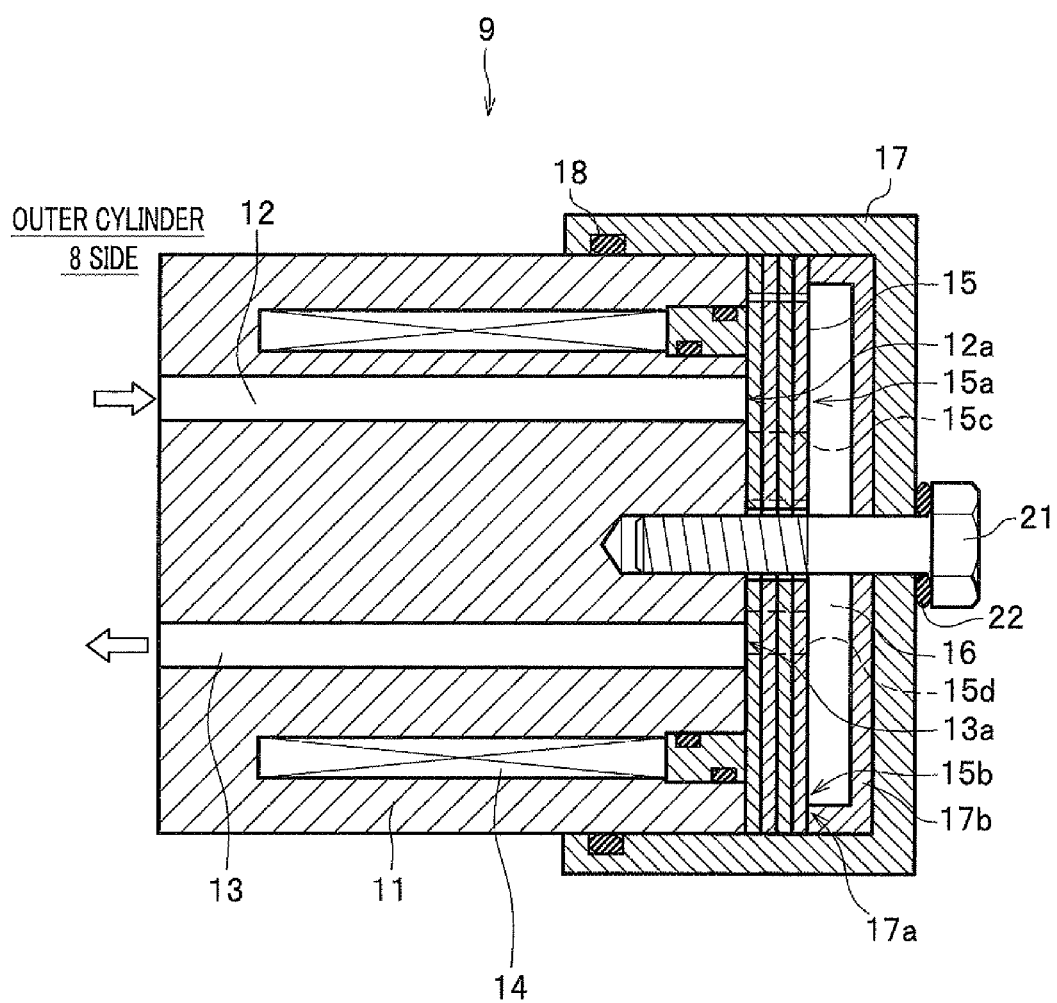
FIG. 11 is a longitudinal cross-sectional view of a damping-force control device which is arranged in a damper with variable damping force according to a seventh embodiment of the present invention.

FIG. 11 is a longitudinal cross-sectional view of the damping-force control device 9 which is arranged in the damper with variable damping force according to the seventh embodiment of the present invention. The seventh embodiment is different from the sixth embodiment in that the cap 17 is constituted by a main portion and a separate stopper (opening limiter) 17*b*, which is formed separately from the main portion of the cap 17. The separate stopper (opening limiter) 17*b* includes a planar main portion and a step portion 17*a*. The outer periphery portion of the valve element 15 is held between the step portion 17*a* and the valve seat 11. The planar main portion and the step portion 17*a* of the separate stopper (opening limiter) 17*b*, together with the valve seat 11, define the variable pressure chamber 16. The opening of the valve element 15 contained in the variable pressure chamber 16 can be limited when the valve element 15 comes into contact with the planar main portion of the separate stopper (opening limiter) 17*b*. The maximum degree of opening of the valve element 15 can be easily changed and adjusted by changing the thickness of the planar main portion of the separate stopper (opening limiter) 17*b* and the height of the step portion 17*a*, i.e., by replacing the separate stopper (opening limiter) 17*b* with another separate stopper which has a different thickness of the planar main portion or a different height of the step portion 17*a*. Further, the main portion and the separate stopper (opening limiter) 17*b* may be made of different materials. For example, the separate stopper (opening limiter) 17*b* may be made of a material which is more resistant to the operating oil 5 than the main portion of the cap 17, and the main portion of the cap 17 may be made of a material which has higher strength than the separate stopper (opening limiter) 17*b*.

(Eighth Embodiment)

Figure 12:
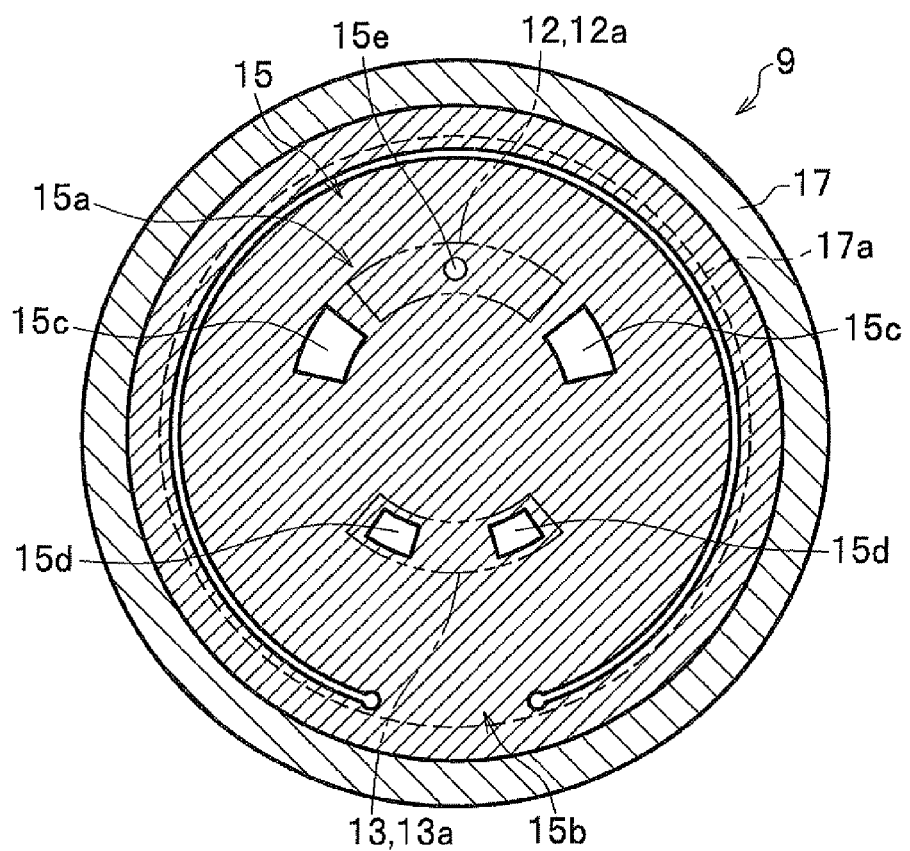
FIG. 12 is a lateral cross-sectional view of a damping-force control device which is arranged in a damper with variable damping force according to an eighth embodiment of the present invention.

FIG. 12 is a lateral cross-sectional view of the damping-force control device 9 which is arranged in the damper with variable damping force according to the eighth embodiment of the present invention. The eighth embodiment is different from the first embodiment in that an orifice 15*e* is arranged in the valve element 15. The orifice 15*e* is arranged at a position in the valve element 15 in contact or proximity with the first communicating channel 12. According to the above provision, the damping force can be adjusted in such a manner that the rise (rising rate) of the damping force in the valve-closed state becomes gentle.

(Ninth Embodiment)

Figure 13:
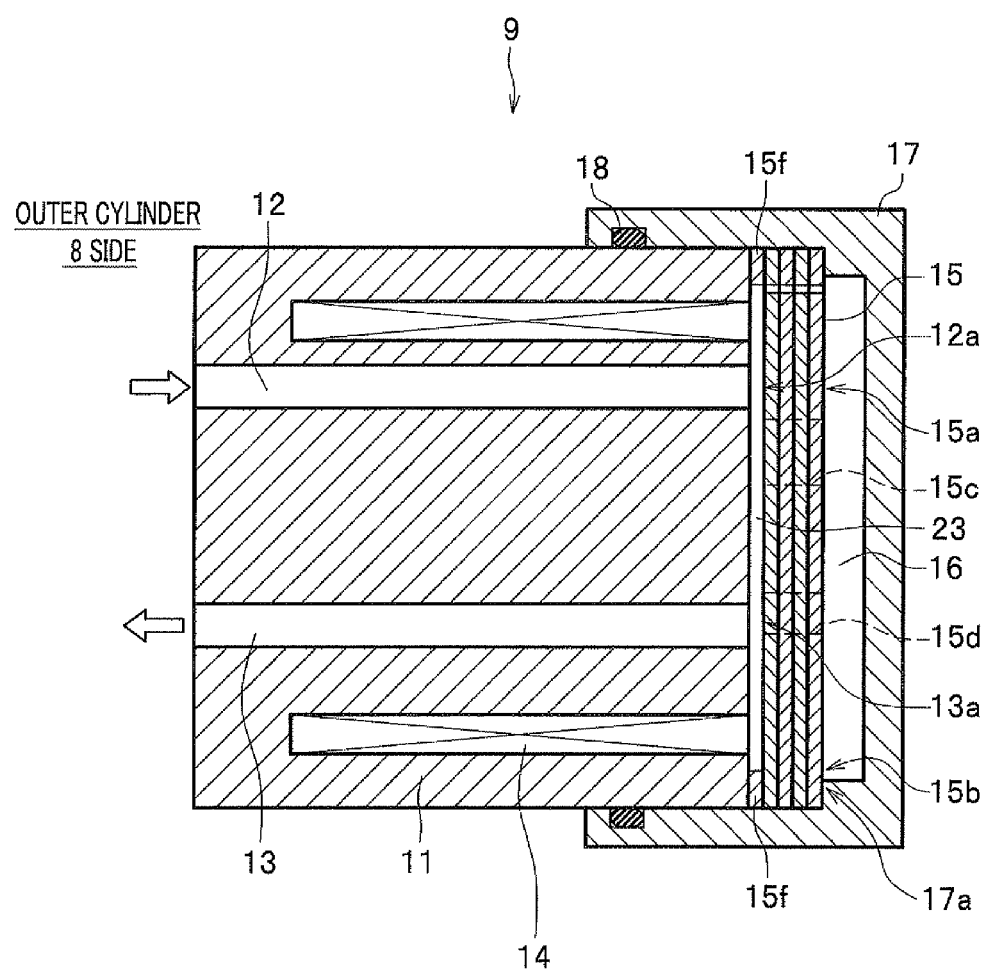
FIG. 13 is a longitudinal cross-sectional view of a damping-force control device which is arranged in a damper with variable damping force according to a ninth embodiment of the present invention.

FIG. 13 is a longitudinal cross-sectional view of the damping-force control device 9 which is arranged in the damper with variable damping force according to the ninth embodiment of the present invention. The ninth embodiment is different from the first embodiment in that a shim (spacer) 15*f* is inserted between the valve seat 11 and the valve element 15. Since the shim 15*f* is inserted between the valve seat 11 and the valve element 15, it is possible to prevent the valve element 15 from coming into contact with the valve seat 11 when the electromagnetic solenoid 14 exerts no attractive force even in the valve-closed state. According to the above provision, a gap is produced on the valve seat 11 side of the valve element 15 in the range from the opening 12a of the first communicating channel 12 to the opening 13a of the second communicating channel 13, so that an intermediate channel 23 through which the first communicating channel 12 communicates with the second communicating channel 13 without passing through the valve element 15 can be formed. Therefore, it is possible to prevent rapid rising of the damping force and occurrence of abnormal noise. Since a differential pressure corresponding to the flow rate of the operating oil is generated, the force of driving the valve element 15 can be suppressed even when a rapid stroke or the like occurs. The cap 17 is coupled to the outer periphery of the valve seat 11 by fitting, press fitting, or the like and held on the outer periphery of the valve seat 11. In order that the step portion 17a of the cap 17 can exert sufficient holding force on the outer peripheral portion of the valve element 15 and the shim 15f, the cap 17 and the seat face of the valve seat 11 are formed to be so close to each other that compressive force is exerted on the valve element 15 and the shim 15f.

LIST of REFERENCE SIGNS

1: Damper with variable damping force
2: Cylinder
2a: Upper Chamber (Inner Chamber)
2b: Middle Chamber
2c: Lower Chamber
2d: Buffer Member
3: Piston
3a: Piston Rod
3b: Check Valve
4: Bottom Valve
4a: Check Valve
5: Operating Oil
6: Intermediate Oil Channel
7: Reservoir Chamber
8: Outer Cylinder
9: Damping-force Control Device
11: Valve seat
12: First Communicating Channel
12a: Opening (Liquid Outlet)
13: Second Communicating Channel
13a: Opening
13b: Groove
13c: Bevel Portion
13d: Bypass Channel
14: Electromagnetic Solenoid
15: Valve Element
15a: Open/Close Portion
15b: Support Portion
15c: First Holes
15d: Second Holes
15e: Orifice
15f: Shim
16: Variable Pressure Chamber
17: Cap
17a: Step Portion
17b: Separate Stopper (Opening Limiter)
18: Oil Packing
19: Sealant
21: Bolt
22: Oil Packing F1, F2: Channel from First Communicating Channel to Second Communicating Channel in Variable Pressure Chamber
P: Pressure Directed to Close Valve Element

The invention claimed is:

1. A damper with variable damping force comprising:
an inner cylinder which defines an inner chamber therein;
a piston disposed in the inner chamber of the inner cylinder in slidable contact therewith;
an outer cylinder which is arranged outside the inner cylinder and defines a reservoir chamber between the inner cylinder and the outer cylinder; and
a damping-force control device which controls a damping force by controlling a flow rate of an operating oil between the inner chamber and the reservoir chamber;
wherein the damping-force control device includes,
a valve seat having a cylindrical post shape which is formed to externally project from the outer cylinder and includes an electromagnetic solenoid, and in which an opening for a first communicating channel connected to the inner chamber and an opening for a second communicating channel connected to the reservoir chamber are formed along an inner side of the electromagnetic solenoid, a valve element which opens and closes on the valve seat by electromagnetic force, and controls a flow of the operating oil between the first communicating channel and the second communicating channel, and a cap which is fixed to the valve seat and defines a variable pressure chamber between the cap and the valve element,
wherein the valve element is directly sandwiched in contact between the cap and the valve seat, and
wherein the variable pressure chamber is connected to the first communicating channel and the second communicating channel by operation of the valve element.

2. The damper with variable damping force according to claim 1,
wherein the first communicating channel communicates with the second communicating channel through an opening of the valve element in a state in which the valve element is open, and a biasing force which impels the valve element to a direction of closing the valve element is exerted on the valve element by a differential pressure generated between a front side and a back side of the valve element when the operating oil flows.

3. The damper with variable damping force according to claim 1, wherein: the valve element comprises,
a first through hole arranged in a vicinity of an open and close portion which opens and closes the opening for the first communicating channel,
a support portion which supports the open and close portion in a part of an outer peripheral portion of the valve element so that the open and close portion can be freely opened and closed, and a second through hole arranged to overlap a part of the opening for the second communicating channel; and
wherein the first through hole is more apart from the support portion than the second through hole.

4. The damper with variable damping force according to claim 1, further comprising a spacer arranged between the valve element and the valve seat to provide an intermediate channel through which the first communicating channel communicates with the second communicating channel without passing through the valve element.

5. The damper with variable damping force according to claim 1, wherein the valve element has an approximately flat shape.

6. The damper with variable damping force according to claim 1, wherein a periphery of the valve element is directly sandwiched and supported by the cap and the valve seat.

7. The damper with variable damping force according to claim 1, wherein the electromagnetic solenoid is disposed closer to the outer cylinder of the damper than is the valve element.

8. The damper with variable damping force according to claim 7, wherein the valve element is disposed at an end of the valve seat spaced away from the outer cylinder.

9. The damper with variable damping force according to claim 1, wherein the valve element is disposed at n end of the valve seat spaced away from the outer cylinder.

* * * * *